(12) United States Patent
Olbert et al.

(10) Patent No.: US 9,616,406 B2
(45) Date of Patent: Apr. 11, 2017

(54) INSTALLING MONOLITHS IN A REACTOR FOR CONDUCTING HETEROGENEOUSLY CATALYZED GAS PHASE REACTIONS

(71) Applicant: BASF SE, Ludwigshafen (DE)

(72) Inventors: Gerhard Olbert, Dossenheim (DE); Jochen Gauer, Ludwigshafen (DE); Arnold Kühling, Bellheim (DE); Carlos Tellaeche Herranz, Heidelberg (DE)

(73) Assignee: BASF SE, Ludwigshafen (DE)

( * ) Notice: Subject to any disclaimer, the term of this patent is extended or adjusted under 35 U.S.C. 154(b) by 233 days.

(21) Appl. No.: 14/180,455

(22) Filed: Feb. 14, 2014

(65) Prior Publication Data

US 2014/0228610 A1    Aug. 14, 2014

Related U.S. Application Data

(60) Provisional application No. 61/764,557, filed on Feb. 14, 2013.

(51) Int. Cl.
*B01J 19/24*    (2006.01)

(52) U.S. Cl.
CPC .... *B01J 19/2485* (2013.01); *B01J 2219/2438* (2013.01); *B01J 2219/2443* (2013.01); *Y10T 29/49826* (2015.01)

(58) Field of Classification Search
CPC ............ B01J 19/2485; B65D 81/2023; Y10T 29/49826
See application file for complete search history.

(56) References Cited

U.S. PATENT DOCUMENTS

| | | | |
|---|---|---|---|
| 3,921,273 A | 11/1975 | Kondo et al. |
| 4,999,168 A | 3/1991 | Ten Eyck |
| 5,882,608 A | 3/1999 | Sanocki et al. |
| 6,491,878 B1 | 12/2002 | Locker et al. |

(Continued)

FOREIGN PATENT DOCUMENTS

| | | |
|---|---|---|
| CN | 1190695 A | 8/1998 |
| CN | 1083927 C | 5/2002 |

(Continued)

OTHER PUBLICATIONS

U.S. Appl. No. 61/764,557, Gerhard Olbert.
U.S. Appl. No. 61/562,454, Gerhard Olbert.

*Primary Examiner* — Jacob Cigna

(57) ABSTRACT

A method is proposed for installing monoliths (2) each formed of a ceramic block having a multiplicity of mutually parallel channels wherethrough the reaction gas mixture of a heterogeneously catalyzed gas phase reaction can flow in a reactor (1) for conducting heterogeneously catalyzed gas phase reactions, wherein said monoliths (2) are stacked side by side and on top of each other in the reactor interior, wherein the monoliths are sealed off from each other and from the inner wall of said reactor (1) by mats (3) each comprising an intumescent mat which before installation in said reactor (1) were completely enveloped in a polymeric film, wherein the interior enclosed by the polymeric film and containing said mat (3) is evacuated and wherein the interior enclosed by the polymeric film and containing said mat (3) is devacuated after installation in said reactor (1).

12 Claims, 3 Drawing Sheets

(56) References Cited

U.S. PATENT DOCUMENTS

| | | |
|---|---|---|
| 2001/0048903 A1 | 12/2001 | Sanocki et al. |
| 2004/0052609 A1 | 3/2004 | Kraus |
| 2004/0052698 A1 | 3/2004 | Sanocki et al. |
| 2005/0232828 A1 | 10/2005 | Merry |
| 2006/0027314 A1 | 2/2006 | Jones et al. |
| 2008/0063875 A1 | 3/2008 | Robinson et al. |
| 2009/0292030 A1* | 11/2009 | Casey ................ B01J 8/0214 518/700 |
| 2011/0030355 A1 | 2/2011 | Gilmer et al. |
| 2011/0130607 A1* | 6/2011 | Kolios ............... B01J 19/2485 585/443 |
| 2012/0055140 A1* | 3/2012 | Johnson ............... F01N 3/2853 60/299 |
| 2013/0035529 A1 | 2/2013 | Olbert et al. |
| 2013/0035531 A1 | 2/2013 | Olbert et al. |
| 2014/0171709 A1 | 6/2014 | Olbert et al. |
| 2014/0227160 A1 | 8/2014 | Olbert et al. |

FOREIGN PATENT DOCUMENTS

| | | | |
|---|---|---|---|
| DE | 3827863 A1 | 2/1990 | |
| DE | WO 2012084609 A1 * | 6/2012 | .......... B01J 19/2485 |
| EP | 0192417 A2 | 8/1986 | |
| GB | 2171180 A * | 8/1986 | ............. B65D 75/38 |
| WO | WO-2012084609 A1 | 6/2012 | |
| WO | WO-2013017609 A1 | 2/2013 | |
| WO | WO-2014125024 A1 | 8/2014 | |

\* cited by examiner

INSTALLING MONOLITHS IN A REACTOR FOR CONDUCTING HETEROGENEOUSLY CATALYZED GAS PHASE REACTIONS

CROSS-REFERENCE TO RELATED APPLICATIONS

This application claims benefit (under 35 USC 119(e)) of U.S. Provisional Application Ser. No. 61/764,557, filed Feb. 14, 2013, which is incorporated herein by reference in its entirety.

BACKGROUND OF THE INVENTION

The invention relates to a method of installing monoliths in a reactor for conducting heterogeneously catalyzed gas phase reactions.

Reactors for conducting heterogeneously catalyzed gas phase reactions frequently contain a multiplicity of monoliths composed of ceramic materials. At the side edges thereof, in the direction of the channels through the monoliths, these are frequently surrounded with a metal housing to protect the fragile ceramic material. Since the monoliths are not always perfectly planar, the direct assembly of the individual monoliths without sealing elements therebetween is problematical. In addition, the ceramic monoliths have a distinctly lower coefficient of thermal expansion than the metallic housing, so changes in the distance between the ceramic monoliths and the metallic housing will occur in high-temperature reactors, i.e., especially at reaction temperatures above 400° C. or else above 500° C.

Huge bracing forces are needed to obtain bypass-free monolith systems from monoliths and sealing elements (intumescent mats) by the methods of the prior art.

It is an object of the present invention to provide a method of installing a multiplicity of monoliths in reactors for conducting heterogeneously catalyzed gas phase reactions which is free of the above disadvantages.

BRIEF SUMMARY OF THE INVENTION

It has been found that this object is achieved by a method of installing monoliths each formed of a ceramic block having a multiplicity of mutually parallel channels wherethrough the reaction gas mixture of a heterogeneously catalyzed gas phase reaction can flow into a reactor for conducting heterogeneously catalyzed gas phase reactions, wherein said monoliths are stacked side by side and on top of each other in the reactor interior, wherein the monoliths are sealed off from each other and from the inner wall of said reactor by mats each comprising an intumescent mat which before installation in said reactor were completely enveloped in a polymeric film, wherein the interior enclosed by the polymeric film and containing said mat is evacuated and wherein the interior enclosed by the polymeric film and containing said mat is devacuated after installation in said reactor. The interior containing the mat may be devacuated in particular by puncturing and/or burning off the polymeric film.

DETAILED DESCRIPTION OF THE INVENTION

Figure 1:
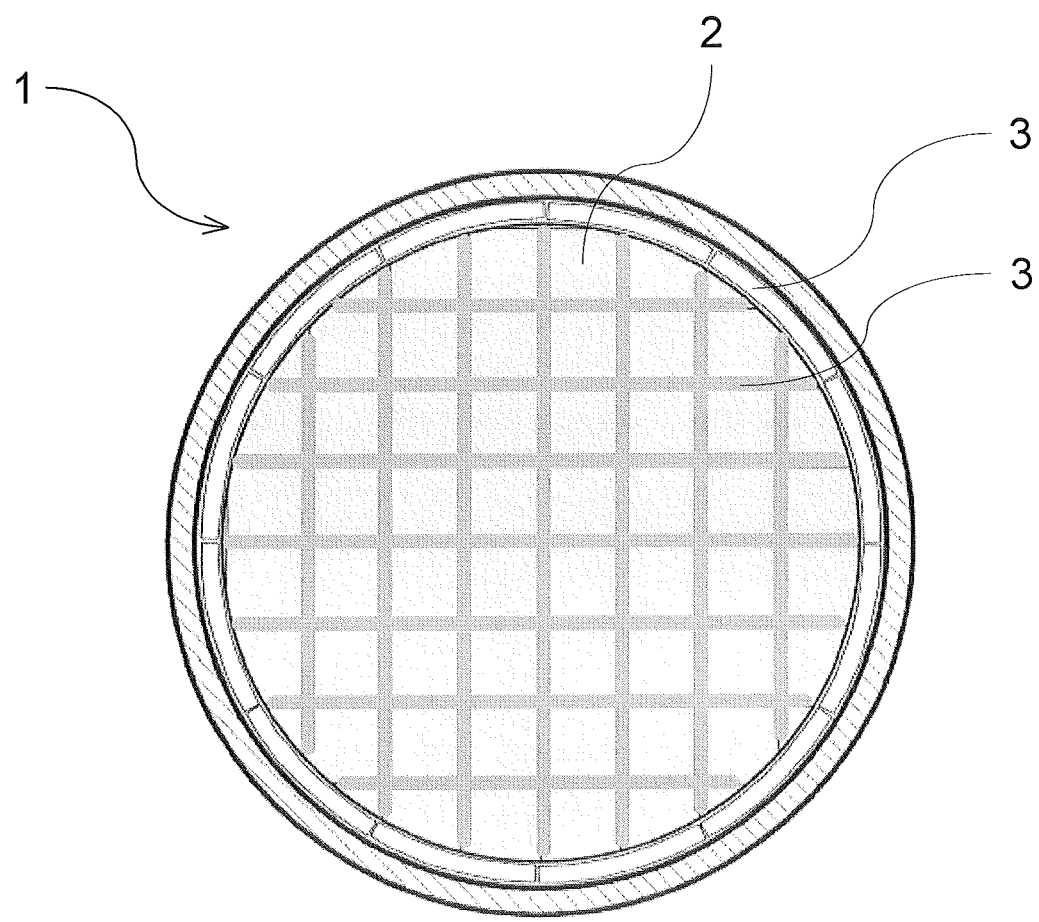
FIG. 1 shows a cross section through a reactor assembled according to the method of the present invention, in a first version.

Monoliths for use in reactors for performing heterogeneously catalyzed gas phase reactions are known and described in WO-A 2012/084609 for example. Monoliths are formed of a ceramic material coated with catalytically active material.

In a first preferred version, said monoliths are installed into said reactor in one or more horizontal layers side by side with vertically disposed channels such that each layer fully fills out the reactor cross section, and wherein spacers are provided between successive layers to vacate cavities whereinto measuring elements, in particular for temperature measurement, can be introduced. The reaction mixture of the heterogeneously catalyzed gas phase reaction flows vertically, through the vertically disposed channels of the monoliths. Examples of the spacers provided are metal strips having a width of 10 to 30 mm in particular and installed between any two successive horizontal layers of monoliths, so these are spaced apart according to the width of the metal strips. The metal strips may preferably be angled; this increases their stiffness, and they can support higher weights.

In a further preferred version, the monoliths are installed in the reactor such that mutually parallel channels therein are horizontal in the reactor. To this end, two or more monoliths are arranged side by side and on top of each other, with channels aligned in a mutually parallel arrangement, and are enclosed at the outer periphery thereof, in the longitudinal direction of the channels, by a metal enclosure to form a monolith module. Said monolith modules are installed in said reactor with horizontally disposed channels.

To enlarge the area facing the flow, advantageously two or more monolith modules are stacked on top of each other to form monolith module stacks.

In another possible embodiment, two or more monolith module stacks are installed in said reactor one behind the other to increase the capacity or to achieve the desired conversion.

Preferably, the metal enclosure surrounding the monoliths projects at both of its ends slightly beyond the monoliths, especially by about 5 to 10 mm. As a result, the metal enclosure functions as spacer between monolith layers stacked on top of each other. The cavity vacated as a result may advantageously be used to simply introduce multi-thermocouples for temperature measurement through holes and/or drill-holes into the projecting edge of the metal enclosure.

Preferably, the mutually opposite sides of the metal enclosure both in front of and behind the monoliths are welded together using metallic struts, so mechanical stability is ensured for the monolith module in the metal enclosure. The metal enclosure can be made thinner as a result.

The modular form of construction ensures simpler handling to install the monoliths in the reactor and remove them therefrom. On-stream time can be extended, since replacement systems for the catalyst change can be prepared outside the reactor.

Owing to the metal enclosure, the monolith modules are simple to push into and pull out of the reactor via guide rails.

The mat used herein is a sheet body having two mutually opposite major surfaces and two front end surfaces disposed perpendicularly thereto.

The mat comprises an intumescent mat, i.e., a fibrous mat which expands (swells) at high temperatures. Intumescent mats are generally composed of silicates, e.g., aluminum silicate, an expandable mica, e.g., vermiculite, and an organic binder. INTERAM® intumescent mats are available from 3M for example.

Organic binders have a whole series of disadvantageous properties, however, in that more particularly they cause odor nuisance due to offgassing of volatiles and catalyst poisoning. Intumescent mats are therefore increasingly required to have a reduced level of organic binders, from formerly about 12 to 14 wt % to currently about 2 to 5 wt % and especially 3 to 4 wt % of organic binder, based on the overall weight of the intumescent mat. However, the reduced level of organic binder makes intumescent mats crumblier, less plastically deformable and more difficult to handle.

However, these disadvantages are overcome by completely enclosing the intumescent mats in a polymeric film in the manner of the present invention, so mats having the required reduced binder contents are also simple to handle and introduce into the cavities to fill them out.

In one embodiment, the mat consists exclusively of an intumescent mat.

In a further embodiment, the intumescent mat is a composite mat which in addition to an intumescent mat includes a fibrous mat of oxidic fibers, especially of alumina, which relative to an intumescent mat is lighter, has a higher compressive strength and a lower thermal conductivity and is thermally stable up to about 1200° C.

The intumescent mat and the oxidic-fiber fibrous mat which combine to form the composite mat are each sheet bodies whose adjoining major surfaces are connected together.

It is further advantageous to use a composite mat comprising a plurality of successive layers each consisting of one intumescent mat and one fibrous mat of oxidic fibers.

A further preferred embodiment utilizes a mat which has a reinforcing material at its end surfaces.

Advantageously, polyamides or a mixture of polyamides with polyethylene and/or polypropylene are used as plastics for the polymeric film surrounding the intumescent mat.

After installation, the polymeric film is punctured and/or burned off. This ensures sealing of the monoliths from each other and also from the inner wall of the reactor.

The mat is preferably covered with a polymeric film having one surface which is textured, i.e., not perfectly smooth; the mat is covered with the polymeric film such that the textured side thereof faces the mat. This facilitates evacuation, since the mutually abutting fine surficial structures on the mutually opposite textured inner surfaces of the polymeric film combine to form cavities wherethrough the air can be sucked away.

Perfectly planar surfaces, by contrast, would stick to each other and make it difficult to evacuate the interior.

The invention also provides a reactor assembled according to the above method.

The reactor is very useful for conducting dehydrogenations, especially of butane or propane, or partial oxidations.

LIST OF REFERENCE NUMERALS

Figure 2:
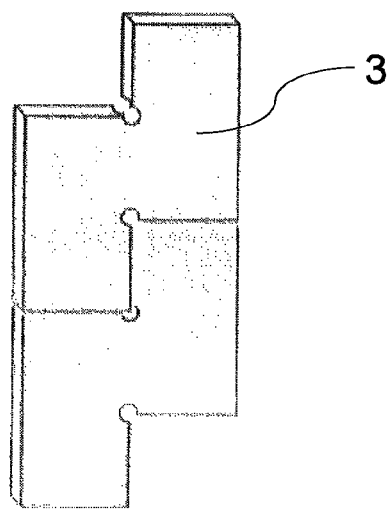
FIG. 2 shows a schematic depiction of intumescent mats used according to the present invention.
Figure 3:
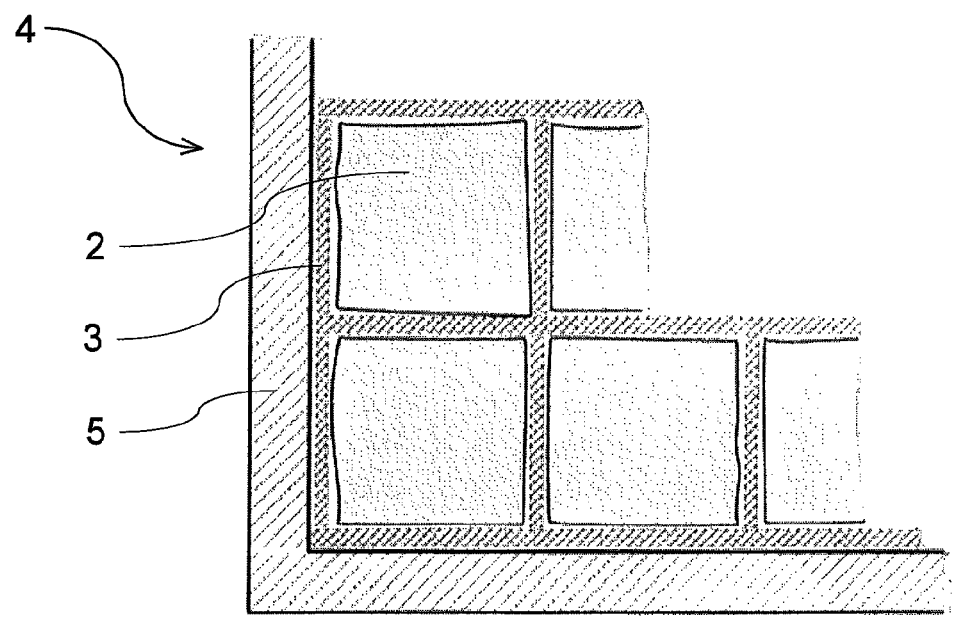
FIG. 3 shows a detail from a monolith module for installation in a reactor according to a second version.
Figure 4:
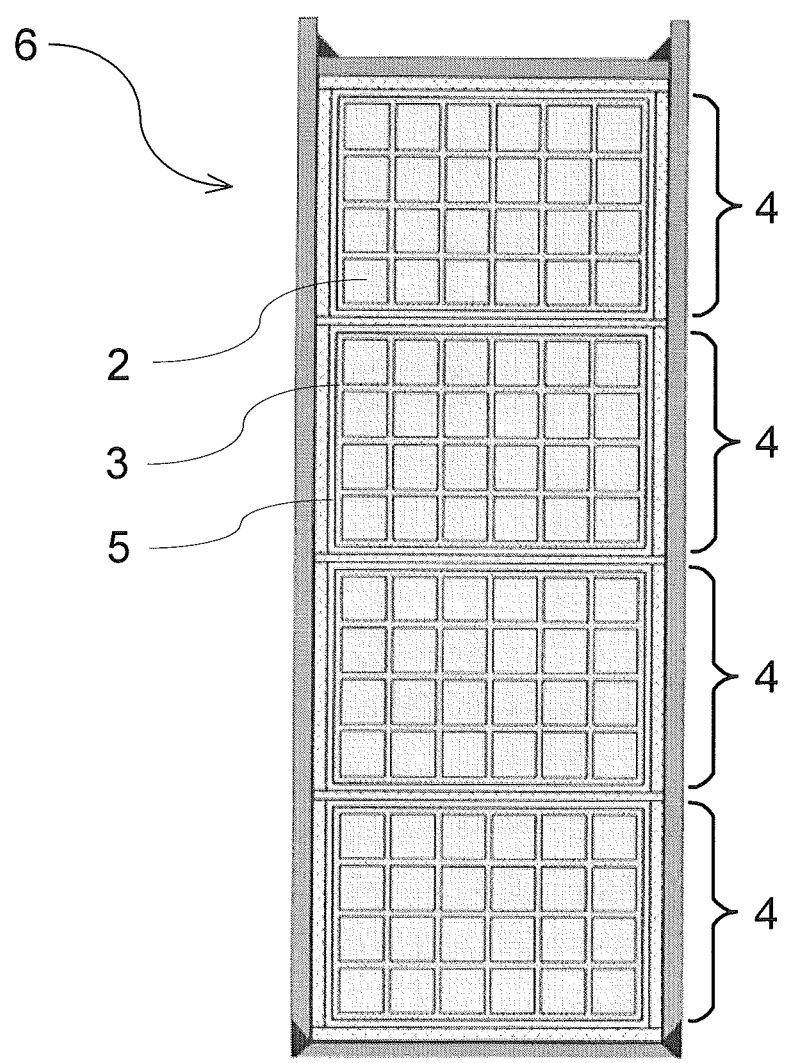
FIG. 4 shows a schematic depiction of a monolith module stack having, by way of example, four monolith modules stacked on top of each other.

1 Reactor
2 Monolith
3 Mat
4 Monolith module
5 Metal enclosure
6 Monolith module stack The invention will now be more particularly described with reference to a drawing, where specifically FIG. 1 shows a cross section through a reactor assembled according to the method of the present invention, in a first version, FIG. 2 shows a schematic depiction of intumescent mats used according to the present invention, FIG. 3 shows a detail from a monolith module for installation in a reactor according to a second version, and FIG. 4 shows a schematic depiction of a monolith module stack having, by way of example, four monolith modules stacked on top of each other.

The schematic depiction in FIG. 1 shows a cross section through a cylindrical reactor 1, having a multiplicity of monoliths 2 arranged in the reactor interior and sealed off from each other and from the inner wall of the reactor by mats 3 which each comprise an intumescent mat and which is completely enveloped in an undepicted polymeric film. The channels of monoliths 2 form a vertical parallel arrangement in the reactor interior and the reaction mixture of the gas phase reaction accordingly flows through them downwardly or upwardly.

FIG. 2 shows a preferred geometric shape, with right-angled downstepping for the ends of mats 3 used according to the present invention, which are each completely sealed in an undepicted polymeric film.

FIG. 3 shows a detail from a monolith module 4 formed from a multiplicity of monoliths 2 which are arranged side by side and one on top of the other and which are covered by a metal enclosure 5, wherein the monoliths 2 are sealed off from each other and also from said metal enclosure 5 by mats 3. The mutually parallel channels of monoliths 2 are horizontal.

FIG. 4 shows a monolith module stack 6 formed from, by way of example, four monolith modules 4 which are arranged one on top of the other and which are each formed from monoliths 2, an outer metal enclosure 5 and also with mats 3 which seal the monoliths 2 off from each other and also from the metal enclosure 5.

We claim:

1. A method of installing a multiplicity of monoliths comprising;
stacking the multiplicity of monoliths side by side and on top of each other in a heterogeneously catalyzed, gas phase dehydrogenation reactor, wherein each monolith is formed of a ceramic block having multiple parallel channels, and with the parallel channels of one monolith mutually aligned with the parallel channels of an adjacent monolith through which a reaction gas mixture can flow through the reactor for conducting heterogeneously catalyzed, gas phase dehydrogenation reactions, and the multiplicity of monoliths are separated from each other and from an inner wall of the reactor by an arrangement of mats each mat comprising an intumescent mat, wherein the mats are enclosed and sealed within a polymeric film under reduced pressure, and
unsealing the polymeric film enclosure of the arranged mats in the reactor to seal the monoliths from each other and from the inner wall of the reactor.

2. The method according to claim 1 wherein said mat is an intumescent mat.

3. The method according to claim 1 wherein the polymeric film comprises one or more polyamides or mixtures of one or more polyamides with polyethylene and/or polypropylene.

4. The method according to claim 1 wherein the unsealing of the enclosure includes puncturing and/or burning off the polymeric film.

5. The method according to claim 1 wherein the multiplicity of monoliths are installed in the dehydrogenation reactor in one or more horizontal layers side by side across a reactor cross section and forming vertically disposed channels in said reactor, and wherein spacers are provided between successive layers to vacate cavities where a measuring element can be introduced.

6. The method according to claim 5 wherein the measuring element measures temperature.

7. The method according to claim 1 wherein said mat is a composite mat including an intumescent mat and a fibrous mat of oxidic fibers, wherein the intumescent mat and the fibrous mat are each sheet bodies which are joined at their major surfaces.

8. The method according to claim 7 wherein the composite mat comprises a plurality of successive layers each consisting of one intumescent mat and one fibrous mat.

9. The method according to claim 1 wherein the multiplicity of monoliths are arranged side by side and on top of each other, and are enclosed at the outer periphery thereof, in the longitudinal direction of the channels, by a metal enclosure to form a monolith module, and wherein said monolith module is installed in said reactor with horizontally disposed channels.

10. The method according to claim 9, wherein both ends of the metal enclosure extends beyond the monoliths, which allows the enclosure to function as spacer between adjacent monolith modules.

11. The method according to claim 9 wherein two or more monolith modules are stacked on top of each other to form monolith module stacks.

12. The method according to claim 11 wherein two or more monolith module stacks are installed in said reactor one behind the other.

* * * * *